United States Patent Office 3,053,693
Patented Sept. 11, 1962

3,053,693
METAL COATING WITH HEXAVALENT CHROMIUM COMPOUND
Ludwig K. Schuster, Philadelphia, and Alfonso L. Baldi, Jr., Drexel Hill, Pa., assignors to Pennsalt Chemicals Corporation, Philadelphia, Pa., a corporation of Delaware
No Drawing. Filed May 29, 1958, Ser. No. 738,648
16 Claims. (Cl. 117—75)

The present invention relates to the coating of metal, particularly for the reduction of corrosion and the improvement of paint adhesion. This application is in part a continuation of copending applications Serial No. 666,852, filed June 20, 1957, and Serial No. 708,772, filed January 14, 1958, now abandoned.

Among the objects of the present invention is the provision of novel coating formulations which are much simpler to make and use and which are outstanding in their ability to reduce the corrosion of metals as well as to increase the adhesion of paints to the metals.

The above as well as additional objects of the present invention will be more clearly understood from the following description of several of its exemplifications.

A simplified flow diagram of the method in as follows:

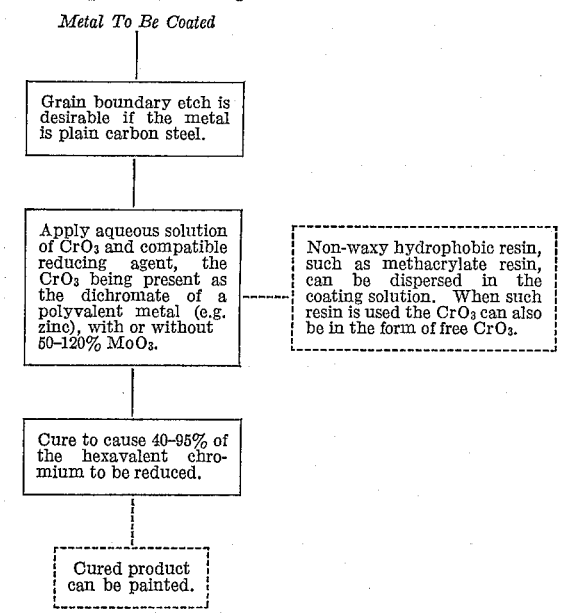

It has been discovered that coating formulations of the type described in U.S. Patent 2,768,103, granted October 23, 1956, U.S. Patent 2,768,104, granted October 23, 1956, U.S. Patent 2,773,623, granted December 11, 1956, and U.S. Patent 2,777,785, granted January 15, 1957, are considerably improved by incorporating in them a non-waxy hydrophobic resin. The amount of resin is such that it is present in a ratio of between about 5:1 and 1:5 with respect to the weight of the chromic acid in the formulations of the above patents. The resin-containing formulations are even further improved by converting the chromic acid to a water-soluble dichromate of a metal having a valence higher than 1. In fact, such conversion (or replacement) even improves the resin-free type of formulation.

Pursuant to the above, a coating mixture in accordance with the present invention is in the form of an aqueous dispersion of a non-waxy hydrophobic resin containing a dissolved chromium compound from the class consisting of chromic acid and the water-soluble dichromates of metals having a valence higher than one, the mixture also containing a dissolved reducing agent for the chromium in the chromium compound, said reducing agent being compatible in the mixture for at least one day at 80° F., the resin and chromium compound being in the ratio of from 5:1 to 1:5 in parts by weight of resin to parts by weight of the chromic acid equivalent of the chromium compound, and the reducing agent being present in a concentration that causes the reduction of from 40 to 95% of the chromium in the chromium compound when the dispersion is dried at a temperature at least as high as 212° F. The application of such a mixture on a surface to be protected, followed by the above drying produces the desired protective film.

When the drying is carried out at temperatures of from 250 to 450° F., a fully cured product is obtained, even though the overall drying operation is completed in as little as one second. Below 250° F. the cured coating is not as effective. At drying temperatures over 400° F., the resins tend to be adversely affected if the drying treatment takes more than a few seconds, so that this is a safe maximum operating temperature.

Although the above coating mixtures can be applied so as to form a coating of any thickness, even up to 0.3 mil (weighing 2000 milligrams per square foot) or more, the preferred thickness is such that the final dried coating weighs between about 40 and 200 milligrams per square foot. In this range its effectiveness and particularly its ductility is outstanding. It is especially useful on a steel which is either plain carbon or low alloy type and which is to be subjected to drawing or forming operations. The preliminary treatment of such steels to impart to the surface a grain boundary etch is of special value when such steels are coated in accordance with the present invention.

The above coatings even though the thicknesses are appreciably lower than those in which protective paints are usually applied, are generally sufficient to protect all corrodible metals against the general type of corrosion conditions. Metals suitable for such protection include iron, copper, aluminum, zinc, magnesium, titanium, zirconium, chromium, tungsten, tantalum, cobalt, nickel, cadmium, tin, lead and germanium.

For the most rugged protection, as in automobile bodies, where readily corrodible steel is to be exposed to all sorts of weather conditions as well as salt spray, chemical fumes, etc., the coatings of the present invention can be covered by paint films.

The following examples illustrate the present invention:

*Example 1*

A pressure container drawn in one piece from SAE 1010 steel and having a wall thickness of 12 mils, is cleaned by solvent degreasing with trichloroethylene, then sprayed over its interior and exterior with an aqueous solution having 2% $CrO_3$, ⅔% sucrose, 0.1% Triton 102 (the alkyl aryl polyether alcohol made by condensing one mol of p-(n-octyl) phenol with three mols of ethylene oxide) and 2% (solids content) of the butadiene-styrene (30:70) copolymer made as in Example II of U.S. Patent 2,683,698, granted July 13, 1954. The container was then passed through a hot air furnace held at 400° F. for 3 minutes, the metal surface reaching a temperature of 375° F. Upon cooling, the container which on analysis showed a coating weight of 80 milligrams per square foot, was subjected to outdoor exposure for one month, and showed parctically no corrosion.

The product of Example I is suitable for many commercial purposes such as pressure-type containers for solutions of self-lathering shaving cream, as described in U.S. Patent 2,655,480, granted October 31, 1953. The presence of the resin not only improves the adhesion of paints, but it increases the corrosion resistance, particularly by acids such as are present in anionic detergents and in resin latices. The resin-containing coatings of the present invention are accordingly very useful for application to all kinds of containers and especially those for latex paints as well as for detergents, and can be so used with or without a covering paint or enamel layer. Similar results are obtained with the above resin replaced by the alkyd resin emulsion of Example I in U.S. Patent 2,634,245, granted April 7, 1953, the polyvinyl chloride emulsion of Example I in U.S. Patent 2,689,242, granted September 14, 1954, or the polystyrene emulsion of Example I in U.S. Patent 2,635,086, granted April 14, 1953.

The resistance of the above coated steel to corrosion is still further increased by giving it a grain boundary etch before applying the resin-containing coating. Such etch can be effected with nitric acid, as described in U.S. Patent 2,768,103, or with ammonium persulfate, picric acid, or ferric nitrate, as described in U.S. Patent 2,773,623. A highly preferred etching technique uses a 1.2% aqueous solution of nitric acid (by weight) at a temperature of 80° F. jetted at the metal in a stream impelled at a speed of about 30 feet per second. It only takes about two seconds for the above treatment to dissolve away 100 milligrams of metal per square foot of etched surface. In general, a weight loss of about 50 to 400 milligrams per square foot of metal surface is preferred, although these limits can be exceeded if the full advantage of the etching is not desired.

Example II

A line for treating SAE 1010 sheet steel 11 mils thick at the rate of 130 feet per minute, was set up with an uncoiler, an electrolytic cleaner, a tap water rinse, a 1% aqueous $H_2SO_4$ bath, a second tap water rinse, a 3% aqueous nitric acid bath, a third tap water rinse accompanied by a brushing ararngement, a coating station with grooved rubber rolls pressed against the opposite faces of the moving sheet, a flaming oven, and a recoiler with a water-cooled supply roll.

The electrolytic cleaner was a pair of tanks containing an aqueous solution of 3% disodium hydrogen phosphate and 2% sodium carbonate, held at 160° F. Each tank had an electrode held one inch away from both faces of the traveling sheet, the electrode in the first tank being connected to the negative terminal of a source of direct current, and the electrode in the second tank being connected to the positive terminal of this source. A current of 40 amperes per square foot of the treated steel was maintained.

The nitric acid etch was a tank containing a plurality of jet nozzles four inches apart across the width of the sheet and along four feet of its length. Each nozzle had a circular discharge opening ¼ inch in diameter and all were connected to a pump for discharging streams of aqueous 3% $HNO_3$ (by weight) held at a temperature of 70° F., against the sheet under a pressure of 15 pounds per square inch. The acid streams dropping off the sheet were collected and recirculated with periodic additions of fresh $HNO_3$ to keep up the etching activity, and with periodic removal of the used etching bath, replacing the removed bath by fresh acid as needed.

At the coating station a coating dispersion was sprayed across each face of the sheet in the bight of the roll. The coating dispersion was made with an emulsion of butadiene-styrene copolymer produced in accordance with Example I of U.S. Patent 2,683,698 but using styrene in place of the mixed vinyl toluenes, and omitting the sodium bicarbonate. This emulsion was first diluted with water to near its final solids concentration, and acidified with acetic acid to adjust its pH to 4, then mixed with similarly diluted chromic acid predissolved in water in an amount equal to the dry weight of resin, and triethanolamine in an amount ⅓ that of the chromic acid, the mixture being finally diluted with water to give a solids content of 9%. To insure that the emulsion does not break or become unstable, a surface active agent such as Emulphor ON (a condensation product of 20 mols of ethylene oxide with 1 mol of oleyl alcohol) can be added in an amount up to 1/30 of the weight of resin solids. Another very good wetting agent is a condensate of a polyoxypropylene base with ethylene oxide in about 3/1 proportion. This condensate causes less foaming.

Excess coating dispersion running down off the sheet was collected and recirculated. The grooved rolls were pressed together to give a final coating (after flaming) weighing 130 milligrams per square foot on each face.

The flaming oven was six feet long with gas burners directing flames over both surfaces of the sheet and controlled to gradually heat up the sheet to a substantially uniform temperature of 375° F. as it emerged.

The coated sheets produced in the above manner showed no tendency to stick together during the recoiling, indicating that the coatings were fully cured in the few seconds that the heating was applied. Outdoor exposure tests showed the coated steel to have exceptionally high corrosion resistance, exceeding that of electrolytic ¼ pound per base box tinplate (0.000015 inch layer of tin).

Similar results are also obtained when proprietary styrene-butadiene resins, such as "Dow Latex 566" are used.

Example III

Example II was repeated except that in place of the butadiene-styrene resin there was used an emulsion of the alkyd resin prepared as described in Example I of U.S. Patent 2,634,245. An amount of Emulphor ON ⅛ the weight of the $CrO_3$ was used, the ratio of resin to $CrO_3$ was increased to 1.5:1, the sugar reduced to ⅛ the $CrO_3$, the total solids content increased to 12% and the pressure on the coating rolls diminished slightly, to cause the finished coating weight to increase to 170 milligrams per square foot on each face of the steel. Again the coated steel showed no tackiness and seemed to be fully cured immediately after coming out of the flaming oven. As compared with the product of Example II, the final product was about equal in bare corrosion resistance when exposed to outdoor environments.

Example IV

In this case, an aluminum sheet 14 mils thick was used in place of steel, the $H_2SO_4$ bath and the etching step were omitted, and the coating was carried out as in Example III, but with a methacrylate resin in place of the alkyd resin; a coating weight of 110 milligrams per square foot was obtained with a resin-to-$CrO_3$ ratio of 1:2, the Emulphor ON replaced by Triton 102 in an amount 1/30 the weight of resin solids, and an amount of sugar corresponding to 35% of the weight of $CrO_3$.

Excellent salt spray and weathering resistance is shown by the coated aluminum. Similarly desirable results are obtained if the methacrylate resin dispersion is replaced by an emulsion of a linseed oil paint in which the oil had been bodied by heating without blowing at 750° F. for four hours, and containing 2% $TiO_2$ as a pigment. Anodized aluminum also gives excellent results with the above coatings.

Example V

The procedure of Example II was here also followed with SAE 2315 steel sheet 9 mils thick, but the $H_2SO_4$ treatment and the etch were omitted, and the coating resin was a mixture of equal weights of (a) an alkyd resin like that of Example III with the tung oil replaced by an equal amount of soy bean oil, and (b) a butylated melamine-formaldehyde resin prepared by heating 5 mols of formaldehyde with one mol of melamine, an excess of butanol and ½% of phosphoric acid, the heating being continued to cause the water of reaction to be distilled off, and maintained until the viscosity at 25° C. reaches a viscosity grade of R in the Gardner-Holt test. The ratio of coating ingredients was kept the same except for the sugar which was reduced to ⅕ the weight of the CrO₃.

*Example VI*

The procedure of Example II was followed but the coating solution was applied by dipping and had the following formulation:

| | Percent |
|---|---|
| Zinc dichromate | 2.8 |
| Dow Latex 566 (butadiene-styrene copolymer dispersion—the percentage being based on copolymer solid weight) | 2 |
| Sucrose | 0.6 |
| Triton 102 | .04 |

This coating mixture was stable for more than two weeks at 80° F. while a similar mix in which the 2.8% zinc dichromate was substituted by an equivalent amount (2%) of CrO₃ was stable only for less than 24 hours. The above dichromate coating mixture gave a coating weight of 60 milligrams per square foot, and can ends fabricated from the steel thus coated showed good resistance to detergents and outdoor exposure.

*Example VII*

The process of Example VI was repeated but with 2.8% cupric dichromate substituted for the zinc dichromate. This coating mixture was stable for five days. The coating produced in this run when covered with a layer of an oleo resinous can enamel, showed excellent performance when subjected to a solution containing 3% sodium chloride and 0.3% hydrogen peroxide at 75° F. for 18 hours.

As indicated above, preferred resins for the present invention are butadiene-styrene copolymers, alkyds particularly the drying oil modified alkyds, polyvinyl chloride, methacrylate polymers such as polymethyl methacrylate, polystyrene, drying oils such as linseed oil and tung oil resins and melamine-formaldehyde resins. These are particularly desirable, regardless of how they are manufactured or dispersed. If a waxy resin such as polyethylene is used in the chromium-containing coating of the present invention, the adhesion of paints over it is sharply decreased.

It is a feature of the present invention that the resins can be of inexpensive type. Chemically resistant resins such as polytetrafluoroethylene are accordingly not needed and the expense of providing such resins is accordingly avoided. Furthermore polytetrafluoroethylene and similar substituted polyethylene resins are also of a waxy nature and not satisfactory for this reason.

The drying or curing operation used with the chromium-containing coating of the present invention does not require any appreciable time. The mere raising of the metal to the drying or curing temperature is sufficient. Accordingly if a large enough supply of heat is available, the drying or curing can be completed in as little as 1 or 2 seconds, regardless of the type or proportion of resin used; whether the resin be a thermoplastic one or a thermosetting one normally designed to be cured over an interval of 15 minutes or more when used by itself or in standard paint formulations.

Although the resin to chromic acid proportions are effective over the entire range referred to above, a range of from 3:1 to 1:2 is preferred as giving the best results while still retaining a large proportion of the chromium compounds. These chromium compounds are less expensive than the resins.

The use of the above-illustrated dichromates is also desirable when no resin is used in the coating. This is shown in the following example:

*Example VIII*

50 parts by weight of chromic acid is dissolved in 60 parts by weight of water, and to the solution is then gradually added while stirring 20 parts of zinc oxide. The mixture gradually heats up due to the neutralization reaction that takes place, and if there is any sediment left, the mixture is filtered. The resulting solution is diluted to 800 parts with water and then to the diluted solution is added a solution of 15 parts by weight of sucrose in 50 parts of water. The product is then further diluted with water, to 1000 parts, and does not darken significantly on standing. It can be used to apply a resin-free coating either immediately after preparation or after it has been permitted to sit as long as three weeks or more at 80° F. The coating formed by this mixture is about 21% zinc in combined form, and is somewhat more corrosion resistant than a corresponding coating in which the zinc content is reduced in content to only 5% of the final product. This improvement in corrosion resistance is noted with zinc oxide contents down to about 15%.

The mixture of this example gives a coating which even at weights of 50 milligrams per square foot is appreciably more ductile than a coating containing only 5% zinc. It can therefore be used more effectively to make containers of ordinary black plate stock whether or not any additional coating is to be applied over it. For such use, the black plate stock is coated in sheet form and the coated sheet then punched and shaped into the desired portions of the can which are then assembled together as by crimping. The coating of this example withstands such stamping and crimping operations extremely well.

For the under surface of automobile bodies, the inside surfaces of metal television cabinets, and other similar uses, the chromium-containing coating of the present invention need not have any additional top coating applied over it. However, where a top coating is applied in the form of a standard paint, for example, it is found that the best adhesion of the top coating is obtained when the chromium-containing layer, which in this combination can be considered a primer coating, has a resin which is of a type compatible with that of the overlying coating. Thus where an alkyd paint top layer is used, the chromium-containing coating works best when it has an alkyd resin incorporated with it. Correspondingly when acrylic enamels are used, an acrylic resin is preferably incorporated in the chromium-containing coating of the invention.

To provide the ultimate adhesion with overlying alkyd paints, the primer coating not only contains an alkyd resin but is kept from the final high temperature until after the top layer of alkyd paint is applied. Thus a preliminary drying of the primer coating when carried out at a temperature of from 175° F. to 225° F. gives a product that passes all adhesion tests after the final paint layer is baked at 300° F. for ten minutes. The only drying requirement for the primer coating is that it is dry when the paint is applied over it, and in fact an unnecessary prolonging of the drying time to more than a minute or two detracts somewhat from the final adhesion.

The above advantage of a low temperature preliminary drying is more marked with dichromate-resin coating mixture than with chromic acid-resin coating mixture, and still more pronounced when resin-free dichromate coating solutions are used as primers.

The plain carbon and low alloy steels that have been referred to are those that contain no more than about 4% of alloying metals. They can have a carbon content varying from extremely low values, 0.05% or even less, to as much as 1.4% or higher. The phosphorus and sulphur contents can range from substantially zero up to several tenths of a percent. Generally phosphorus maxima are about 0.15% and sulphur maxima about 0.3%. These materials include the steels ordinarily considered as carbon steels (SAE 1010 to 1095), free cutting steels, plain carbon tool steels, including those that have up to several percent of silicon, and casting metals.

As explained in the above-identified parent applications, the sugar or triethanolamine of the present invention can be replaced by other reducing agents compatible with the coating solution for at least about one day at 80° F. When the coating operation is carried out expeditiously the stability need be only one hour at 80° F. A list of such reducing agents is included in U.S. Patent 2,777,785 and a few additional ones are disclosed in parent application Serial No. 708,772. Polyvinyl alcohol, aluminum lactate, calcium maleate as well as the similar salts of cations other than alkali metals are examples of further reducing agents that can be used. Although polyvinyl alcohol can be considered a resin, it is hydrophilic. Furthermore, when used in accordance with the present invention, it is present in the coating solution in relatively small amounts and is practically completely oxidized by the chromic acid during the curing operation. The polyvinyl alcohol accordingly does not act like any of the other resins.

The proportion of reducing agent used is one that gives the desired degree of reduction, that is, causes about 40 to 95% of the chromium in the hexavalent chromium to be reduced to trivalent conditions. With sugar as a reducing agent, this proportion comes to about one part of sugar to from about 2 to 5 parts by weight of chromic acid equivalent. Other reducing agents are used in approximately the same overall proportion range. At the higher curing temperatures, e.g. 375° F., reducing agents cause somewhat greater conversion than at lower temperatures, e.g. 250° F.

By the expression "chromic acid equivalent" as used above, is meant the total amount of chromic acid available from the chromium-containing compound. When zinc dichromate is used, for example, there are two mols of chromic acid supplied by each mol of zinc dichromate. The same applies to the other dichromates. With the dichromates very good results are obtained when the conversion of the chromium is anywhere in the 40 to 95% range. On the other hand, the dichromate-free $CrO_3$-containing coating mixtures are generally more effective when the conversion is in the high end of the range, e.g. from about 70 to 95%.

With the usual resin dispersions the amount of reducing agent separately added pursuant to the present invention can be diminished somewhat below that ordinarily used with resin-free coating mixtures. It appears that the surface active agents used to stabilize the resin dispersions act as reducing agents for the chromium compound. This diminution is not significant when the resin to chromic acid ratio is 1:1 or lower, but in higher proportions of resin, a 50% drop in added reducing agent can be made when the coating weights are less than about 40 milligrams per square foot. With a 5:1 ratio in coating weights of 20 milligrams per square foot, an effective reduction of the chormium is obtained without any separately added reducing agent.

However, when the dichromates of the present invention are used in place of chromic acid, the diminution of reducing agent can be made with resin to equivalent $CrO_3$ ratio as low as 1:3, and the reducing agent can be entirely eliminated when the ratio reaches 1.5 or more :1.

It is a further feature of the present invention that as pointed out in connection with Example VI above, the use of the above dichromates greatly prolongs the life of a coating mixture which contains both the chromium compound as well as the reducing agent. As another example, a solution of 6% zinc dichromate and 2% sucrose will have a storage life at 80° F. about twice as long as a corresponding solution containing an equivalent amount of chromic acid and sugar, even when the corresponding solution contains 5% zinc based on the total solids weight after drying. Dichromates of metals other than zinc do not seem to be effective in improving the life of resin-free coating mixtures. Furthermore, the resin dispersion stabilizers tend to be deactivated by chromic acid when used per se apparently by reason of its strong acidity as well as its oxidizing power. When the chromic acid is present in the form of a dichromate in accordance with the present invention, the destabilizing action is sharply reduced, particularly where only a low level of dispersion stabilizer is used, and the stability of dispersion presents no problems. Zinc, calcium, copper, aluminum, magnesium, strontium, manganese and iron dichromates are effective for this purpose.

Molybdic acid can also be dissolved in the coating solutions, and it still further increases the storage life of these solutions when the chromium compound is in the form of the above-mentioned dichromate, and the molybdic acid is dissolved in a concentration of from 50% to about 120% of the weight of the chromic acid equivalent of the dissolved dichromate. Thus an aqueous solution of 15% $CrO_3$ as zinc dichromate, 5% sucrose and 15% molybdic acid as commercial (85%) $MoO_3$ shows no sign of precipitation when subjected to seven cycles in each of which it is held at 120° F. for eight hours, then 75° F. for sixteen hours. Without the $MoO_3$ a precipitate forms after 2–3 such cycles. The precipitate is very light and very fine and can settle out readily. It does not immediately render the solution useless for the application of coatings of the present invention so long as it does not get into the coating itself. The precipitate formed from $CrO_3$-reducing agent mixtures is difficult to deal with and generally cannot be removed satisfactorily.

Either chemically pure $MoO_3$ or commercial grades can be used, although the commercial grades usually contain some fixed ammonia and is somewhat more readily soluble.

The dichromate and dichromate-molybdic acid mixtures of the present invention are also particularly desirable because they wet metal surfaces better than chromic acid solutions.

The degree of reduction of the chromium in the coatings of the present invention can readily be determined after the coatings are cured. In most cases the characteristic dark brown color of inadequately reduced hexavalent chromium will be clearly evident. However, with resins that are somewhat opaque or that contain pigments, the color of the chromium-containing compounds may be difficult to establish. At the minimum degree of reduction (40%) the color should be no more than a very light brown. As the percentage reduction increases, the coating merges to a pale green which is almost invisible except in thick films. A good indication, where the resin is translucent or transparent, is that a distinct brown coloration shows insufficient reduction.

The coating can also be analyzed by scraping or dissolving off the metal and then subjecting it to analysis. The coating will generally dissolve in boiling 20% aqueous sodium hydroxide and to the solution thus formed an excess of potassium iodide is added and the product titrated with a standard solution of sodium thiosulphate to give the hexavalent chromium content. The total chromium content is determined by taking a different portion of the dissolved coating adding excess hydrogen peroxide and boiling to convert the trivalent chromium to hexavalent condition, and then adding excess potassium iodide and titrating it as before. When the coating is on metals such as steel that are attacked by hot aqueous caustic, the values for hexavalent chromium are low, apparently by reason of the reducing effect of the attack of the metal by the caustic. In such cases the coating can be scraped off the metal, or a corresponding coating can be applied to a surface such as glass or paper from which it can be dissolved without any reducing effect. It appears that coatings formed on glass or other inert surfaces are identical to coatings formed the same way on any metal.

Another characteristic of the present invention is that the above resin-free dichromate coating solutions which contain molybdic acid in an amount from 50 to 120% of the weight of the chromic acid equivalent of the dichromate, can be made to give rough coatings that have even more striking paint adhesion if the drying step is completed quickly, that is in a period of less than about 5 seconds. When the heat treatment involved in the drying takes longer, the coating comes out fairly smooth and of a lesser paint adhesion. Similar smooth coatings are obtained with solutions of chromic acid and molybdic acid that contain no dichromates, or less than about 5% dichromate based on the total chromic acid equivalent present.

In the above comparisons of rough as against smooth coatings, the 40 to 95% reduction of the chromium is obtained preferably with the use of an adequate amount of reducing agent. Zinc dichromate is an example of a very effective dichromate for this aspect of the invention, particularly when used with sucrose in a ratio of three parts of chromic acid equivalent to one part of sucrose and with an amount of commercial (85%) molybdic acid equal in weight to that of the chromic acid equivalent.

In some cases the addition of the above dichromates greatly improves resin coatings even in formulations having as little as one part of chromic acid equivalent to ten parts of resin. For instance, an automotive primer based on the butadiene-styrene resin of Example I above and also containing

| Pigment dispersion: | Pounds per 100 gallons of final product |
|---|---|
| Water | 103.0 |
| Tamol 731 (25% in water) (sodium salt of highly carboxylated polymer available from Rohm & Haas Co.) | 3.0 |
| Pure red iron oxide | 69.0 |
| China clay | 69.0 |
| Barium sulfate | 138.0 |
| Surfynol 102 (20% in ethanol) (a hydrocarbyl substituted butine-2,diol-1,4 melting at 61° C. available from Air Reduction Chemical Co.) | 1.5 |
| Let down: | |
| Dow Latex 566 (46% non-volatile) | 588.0 |
| Triton CF-10 (50% non-volatile) (alkyl aryl ether available from Rohm & Haas Co.) | 5.5 |
| Water dispersible manganese (5% metal as manganese naphthenate dispersed in water) | 6.0 |
| | 983.0 | showed much better corrosion resistance and underfilm protection of subsequent layers of paint when zinc dichromate is added in an amount of one part of chromic acid equivalent to twelve parts of dry resin weight. A primer with better sanding properties is obtained by increasing the pigments to twice the value aforementioned.

The improved paint adhesion of the present invention is obtained with any kind of paint, enamel, varnish, lacquer or other resin films. In addition to the paints referred to above, melamine-formaldehyde paints, ordinary linseed oil paints, nitrocellulose lacquers, tung oil varnish are some of the top coatings with which these improvements make themselves felt.

For painting surfaces such as those made of aluminum, it is desirable that these surfaces be roughened, as by abrasion or etching, even before the coating of the present invention is used as a primer.

By reason of the short curing time required by the coating of the present invention, the drying can be carried out while the articles being treated are moving on a production line at a speed of 100 to 700 feet per minute. When continuous sheets are so treated at high speed, it is preferable to quench them before coiling, as by contacting them with water-cooled rolls or flooding them with water. Quenching by direct contact with water improves the properties of the coating somewhat.

Where the coating mixtures of the present invention do not wet surfaces too readily, it is of advantage to heat the surface, as for example to a temperature of 150 to 200° F. The coatings, particularly those that are resin-free, wet such hot surfaces much more quickly and uniformly. Surface active agents used to stabilize the dispersions of the present invention can be either anionic, cationic or non-ionic.

Obviously many modifications and variations of the present invention are possible in the light of the above teachings. It is, therefore, to be understood that within the scope of the appended claims the invention may be practiced otherwise than as specifically described.

What is claimed is:

1. A process for reducing corrosion and improving paint adhesion of metals, said process being characterized by the application to the metal's surface of an aqueous dispersion of a non-waxy hydrophobic resin, a hexavalent chromium compound of the class consisting of chromic acid and water-soluble dichromates of metals having a valence higher than 1, said dispersion also containing a water-soluble reducing agent for the chromium in the chromium compound, the reducing agent being compatible with the dispersion for at least one hour at 80° F. and the weight ratio of resin to the chromic acid equivalent of the chromium compound ranging from about 1:5 to 5:1, and then drying the applied aqueous dispersion on the surface of the metal at a temperature of at least 212° F. to cause the reducing agent to reduce the chromium in the chromium compound to trivalent condition, and the applied dispersion to be converted to an adherent film weighing at least 40 milligrams per foot, the proportion of reducing agent being such that from about 40 to 95% of the chromium is reduced during said drying.

2. The combination of claim 1 in which the resin is a methacrylate resin.

3. In the process of coating metal with an aqueous solution of chromic acid and a compatible reducing agent for the chromic acid, and then drying the coated solution to convert it to a film in which about 40 to 95% of the chromic acid is reduced, the improvement by which there is added to the aqueous coating solution a dispersion of non-waxy hydrophobic resin in an amount such that the resin to chromic acid weight is between about 5:1 and 1:5.

4. In the process of coating metal with an aqueous solution of chromic acid and a reducing agent for the chromic acid, and then drying the coated solution to convert it to a film in which about 40 to 95% of the chromic acid is reduced, the improvements by which the chromic acid is replaced by the water-soluble dichromate of a metal having a valance higher than 1 and there is added to the aqueous coating solution a dispersion of a non-waxy hydrophobic resin in an amount such that the resin to chromic acid equivalent of the dichromate is between about 5:1 and 1:5 in parts by weight.

5. The combination of claim 4 in which the dichromate is zinc dichromate, the ratio of resin to chromic acid equivalent is between 3:1 and 1:2, and the drying is carried out by heating the metal to from 250 to 450° F. for not more than about 2 seconds.

6. The combination of claim 5 in which the resin is a methacrylate resin.

7. A coating mixture in the form of an aqueous dispersion of a non-waxy hydrophobic resin containing a dissolved chromium compound from the class consisting of chromic acid and the water-soluble dichromates of metals having a valence higher than one, the mixture also containing a dissolved reducing agent for the chromium in the chromium compound, said reducing agent being compatible in the mixture for at least one hour at 80° F., the resin and chromium compound being in the ratio of from 5:1 to 1:5 in parts by weight of resin to parts by weight of the chromic acid equivalent of the chromium compound, and the reducing agent being present in a concentration that causes the reduction of from 40 to 95% of the chromium in the chromium compound when the dispersion is dried at a temperature at least as high as 212° F.

8. The combination of claim 7 in which the chromium compound is zinc dichromate.

9. A method of protecting metal with alkyd type paint, said method being characterized by the application to the bare metal of the coating mixture of claim 7 in which the resin is an alkyd resin, drying the coating on the metal at a temperature of from 175° F. to 225° F., applying over this dried coating a film of alkyd type paint, and then curing the resulting combination at a temperature at least as high as 300° F.

10. A coating mixture in the form of an aqueous solution of zinc dichromate and sugar, these ingredients being present in an amount that causes from about 40 to 95% of the chromium in the dichromate to be reduced to trivalent condition when the mixture is dried at a temperature at least as high as 212° F.

11. A coating mixture in the form of an aqueous solution of a water-soluble dichromate of a metal having a valence higher than 1, said solution also containing a reducing agent for the chromium of said dichromate, the reducing agent being compatible in the solution for at least one hour at 80° F., and being present in an amount that causes from about 40 to 95% of the chromium in the dichromate to be reduced to trivalent condition when the mixture is dried at a temperature at least as high as 212° F., said solution also containing dissolved molybdic acid in an amount of from 50 to 120% by weight of the chromic acid equivalent of the dichromate.

12. A metal having its surface coated with a continuous film weighing at least 40 milligrams per square foot and consisting essentially of a non-waxy hydrophobic resin mixed with an in situ reduced chromium compound of the class consisting of chromic acid and water-soluble dichromates of metals having a valence higher than one, about 40 to 95% of the chromium in the chromium compound being reduced, and the proportion of resin to chromium compound being from about 5:1 to 1:5 in parts by weight.

13. The combination of claim 12 in which the metal is a ferrous metal.

14. The combination of claim 12 in which the resin is a methacrylate resin.

15. In the process of coating metal with an aqueous solution of chromic acid and a compatible reducing agent for the chromic acid, and then drying the coated solution to convert it to a film in which about 40 to 95% of the chromic acid is reduced, the improvement according to which the reducing agent is sugar and the chromic acid is replaced by zinc dichromate.

16. A plain carbon steel having a grain boundary etched surface coated with a continuous film weighing at least 40 milligrams per square foot and consisting essentially of a non-waxy hydrophobic resin mixed with an in situ reduced chromium compound of the class consisting of chromic acid and water-soluble dichromates of metals having a valence higher than one, about 40 to 95% of the chromium in the chromium compound being reduced, and the proportion of resin to chromium compound being from about 5:1 to 1:5 in parts by weight.

References Cited in the file of this patent

UNITED STATES PATENTS

| | | |
|---|---|---|
| 2,288,182 | Curtin | June 30, 1942 |
| 2,315,564 | Thompson et al. | Apr. 6, 1943 |
| 2,393,663 | Thomas et al. | Jan. 29, 1946 |
| 2,562,117 | Osdal | July 24, 1951 |
| 2,562,119 | Haon | July 24, 1951 |
| 2,762,732 | Somers | Sept. 11, 1956 |
| 2,768,103 | Schuster et al. | Oct. 23, 1956 |
| 2,768,104 | Schuster et al. | Oct. 23, 1956 |
| 2,773,623 | Schuster et al. | Dec. 11, 1956 |
| 2,777,785 | Schuster et al. | Jan. 15, 1957 |
| 2,816,051 | Harford | Dec. 10, 1957 |
| 2,902,390 | Bell | Sept. 1, 1959 |

FOREIGN PATENTS

| | | |
|---|---|---|
| 558,792 | Great Britain | Jan. 21, 1944 |
| 860,306 | Germany | Dec. 18, 1952 |
| 197,164 | Austria | Apr. 10, 1958 |

OTHER REFERENCES

Close: "The Light Metal Age," November 1944, pages 20–22.

UNITED STATES PATENT OFFICE
CERTIFICATE OF CORRECTION

Patent No. 3,053,693                  September 11, 1962

Ludwig K. Schuster et al.

It is hereby certified that error appears in the above numbered patent requiring correction and that the said Letters Patent should read as corrected below.

In the grant, line 4, and in the heading to the printed specification, lines 6 and 7, for "a corporation of Delaware" each occurrence, read -- a corporation of Pennsylvania --; column 10, line 21, after "per" insert -- square --.

Signed and sealed this 26th day of March 1963.

(SEAL)
Attest:

ESTON G. JOHNSON                 DAVID L. LADD
Attesting Officer                  Commissioner of Patents